A. Van Horn.
Evaporating Pan.
N° 87,890. Patented Mar. 16, 1869.
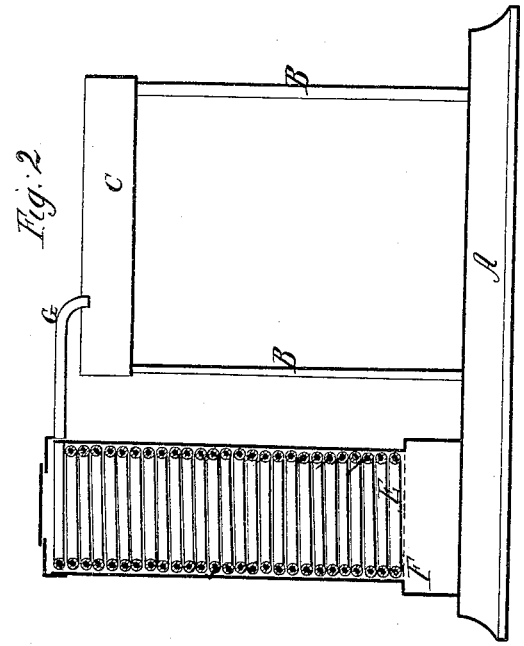
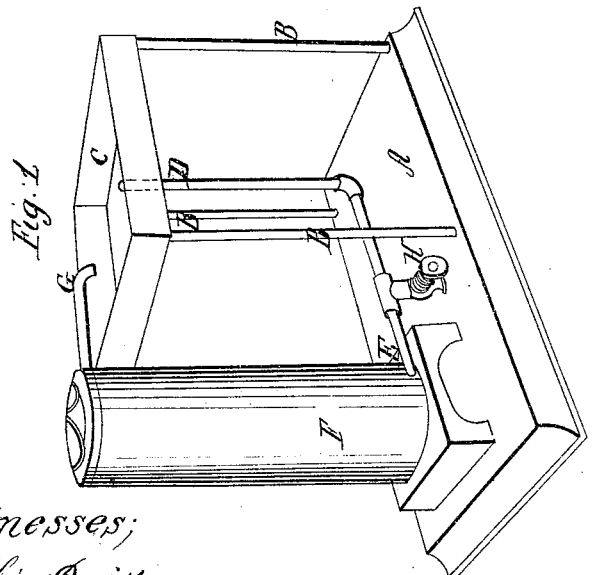
Witnesses;
Franklin Barritt.
Charles L. Harris
Inventor;
Andrew Van Horn

ANDREW VAN HORN, OF BROOKLYN, NEW YORK.

Letters Patent No. 87,890, dated March 16, 1869.

IMPROVED APPARATUS FOR EVAPORATING SALT.

The Schedule referred to in these Letters Patent and making part of the same.

*To all whom it may concern:*

Be it known that I, ANDREW VAN HORN, of Brooklyn, Kings county, and State of New York, have invented certain new and useful Improvements in Apparatus for Evaporating or Concentrating Saline Waters in the Process of Making Salt; and I do hereby declare that the following is a full description of the same.

The nature of my invention consists in combining, with an evaporating-tank, a circulating coil of pipe, and furnace, so arranged as to take the saline water from the bottom of the tank, and, by means of the difference of specific gravity, and its conversion into steam or boiling water by the heat of the furnace, cause it to circulate rapidly through the coil, and be discharged again into the tank, and thus cause it to evaporate with great rapidity.

But to describe my invention more particularly, I will refer to the accompanying drawings, forming a part of this specification, the same letters of reference, wherever they occur, referring to like parts.

Figure 1 is a perspective view of the apparatus.
Figure 2 is a vertical cut section of the same.

Letter A represents the bed of the apparatus, upon which is adjusted, upon suitable supports, B, an evaporating-tank, C.

This tank may be made of wood, metal, or other material, and of such suitable depth and area as to give a great amount of evaporating-surface.

In the bottom of the tank is inserted the end of a pipe, D, which projects downward to near the bed A, when it bends, and connects with the lower end of a coil of pipe, E, projecting from the side of a furnace, F, and terminating in a discharging-nozzle, or stem, G, projecting from the top of the furnace over the middle of the tank.

The length of the coil of pipe may be varied, as circumstances may require, and also the area of the furnace, these particulars being immaterial, so long as they are of such suitable size and proportions as to heat the water, and keep up a rapid circulation of it in the tank, and thus cause its evaporation, or concentration with great dispatch.

When thus concentrated to the requisite density for crystallizing, the solution is drawn off, from any suitable tap, into a second tank, and from thence into a third, if deemed necessary to continue the crystallizing-operation, (not deemed material to show in the apparatus or drawings,) when the evaporating-tank C is refilled with a new charge of the saline water, and the operation of concentrating it repeated.

To regulate the flow of water through the coil of pipe, and the discharge from the same, suitable cocks, H, are inserted therein for that purpose.

Having now described my invention, I will proceed to set forth what I claim, and desire to secure by Letters Patent of the United States.

I claim evaporating or concentrating saline waters for making salt, by means of the combination of an evaporating-tank, C, with a circulating coil of pipe, E, and furnace F, when made and operating in the manner and for the purposes hereinbefore set forth.

ANDREW VAN HORN.

Witnesses:
FRANKLIN BARRITT,
CHARLES L. BARRITT.